(12) United States Patent
Gentry et al.

(10) Patent No.: US 11,098,731 B2
(45) Date of Patent: Aug. 24, 2021

(54) GROOVED SHROUD CASING TREATMENT FOR HIGH PRESSURE COMPRESSOR IN A TURBINE ENGINE

(71) Applicant: HONEYWELL INTERNATIONAL INC., Morris Plains, NJ (US)

(72) Inventors: Timothy Gentry, Tempe, AZ (US); Bruce David Reynolds, Chandler, AZ (US); Nick Nolcheff, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 57 days.

(21) Appl. No.: 16/732,507

(22) Filed: Jan. 2, 2020

(65) Prior Publication Data

US 2020/0182259 A1    Jun. 11, 2020

Related U.S. Application Data

(63) Continuation of application No. 15/431,890, filed on Feb. 14, 2017, now Pat. No. 10,648,484.

(51) Int. Cl.
*F04D 29/52* (2006.01)
*F01D 11/12* (2006.01)
(Continued)

(52) U.S. Cl.
CPC ............ *F04D 29/526* (2013.01); *F01D 5/20* (2013.01); *F01D 11/122* (2013.01); *F04D 29/164* (2013.01); *F04D 29/324* (2013.01); *F01D 11/08* (2013.01); *F02C 3/04* (2013.01); *F04D 29/685* (2013.01); *F05D 2220/32* (2013.01); *F05D 2240/307* (2013.01); *Y02T 50/60* (2013.01)

(58) Field of Classification Search
CPC ....... F04D 29/526; F04D 29/685; F01D 11/08
See application file for complete search history.

(56) References Cited

U.S. PATENT DOCUMENTS 2,278,041 A    3/1942  Allen
3,966,351 A    6/1976  Sproule
(Continued)

FOREIGN PATENT DOCUMENTS

EP    2141328 A1    1/2010
FR    2995949 A1    3/2014

*Primary Examiner* — Woody A Lee, Jr.
*Assistant Examiner* — Behnoush Haghighian
(74) *Attorney, Agent, or Firm* — Lorenz & Kopf, LLP (57) ABSTRACT

A compressor for a turbine engine includes a shroud having a grooved section including a plurality of groove segments extending radially into a shroud surface. A rotor assembly rotatably supported in the shroud includes a rotor hub and a plurality of rotor blades. Each rotor blade extends radially from the rotor hub and terminates at a blade tip, which is spaced from the shroud surface by a tip gap and defines a non-constant clearance region between a leading edge position and a medial chord position along the blade chord at the minimum tip clearance. The rotor blades generate an aft axial fluid flow through the shroud and the grooved section is formed in the shroud surface upstream of the medial chord positon within the non-constant clearance region for resisting a reverse axial fluid flow through the tip gap when the compressor section is operated at near stall conditions.

11 Claims, 3 Drawing Sheets

(51) Int. Cl.
  *F01D 5/20* (2006.01)
  *F04D 29/16* (2006.01)
  *F04D 29/32* (2006.01)
  *F04D 29/68* (2006.01)
  *F01D 11/08* (2006.01)
  *F02C 3/04* (2006.01)

(56) References Cited

U.S. PATENT DOCUMENTS

| | | | |
|---|---|---|---|
| 4,767,266 A | 8/1988 | Holz et al. | |
| 5,181,827 A | 1/1993 | Pellow et al. | |
| 5,632,598 A * | 5/1997 | Maier | F01D 5/225 |
| | | | 415/173.5 |
| 5,914,189 A | 6/1999 | Hasz et al. | |
| 6,231,301 B1 * | 5/2001 | Barnett | F04D 29/526 |
| | | | 415/57.4 |
| 8,550,768 B2 * | 10/2013 | Montgomery | F04D 29/526 |
| | | | 415/1 |
| 8,777,558 B2 * | 7/2014 | Brunet | F04D 29/526 |
| | | | 415/58.6 |
| 8,939,706 B1 | 1/2015 | Lee et al. | |
| 9,249,680 B2 * | 2/2016 | Lee | F01D 11/122 |
| 9,957,817 B2 * | 5/2018 | Zelesky | F01D 11/08 |
| 9,982,554 B2 * | 5/2018 | Perrot | F04D 29/164 |
| 10,066,640 B2 * | 9/2018 | Bennington | F04D 29/526 |
| 2007/0147989 A1 * | 6/2007 | Collins | F01D 11/02 |
| | | | 415/173.1 |
| 2008/0044273 A1 * | 2/2008 | Khalid | F04D 29/321 |
| | | | 415/57.4 |
| 2011/0171010 A1 * | 7/2011 | Li | F01D 11/122 |
| | | | 415/173.1 |
| 2015/0226078 A1 * | 8/2015 | Perrot | F04D 29/526 |
| | | | 415/173.4 |
| 2015/0240652 A1 | 8/2015 | Lee et al. | |
| 2016/0040546 A1 * | 2/2016 | Vo | F01D 11/08 |
| | | | 415/173.1 |
| 2016/0153465 A1 * | 6/2016 | Yoon | F04D 29/685 |
| | | | 60/805 |

* cited by examiner

GROOVED SHROUD CASING TREATMENT FOR HIGH PRESSURE COMPRESSOR IN A TURBINE ENGINE

CROSS REFERENCE TO RELATED APPLICATION

This application is a continuation of U.S. patent application Ser. No. 15/431,890, filed Feb. 14, 2017, now U.S. Pat. No. 10,648,484.

TECHNICAL FIELD

The present invention relates to high pressure compressors in a turbine engine, and more particularly, to a grooved shroud casing treatment in a compressor.

BACKGROUND

Gas turbine engines are often used in aircraft, among other applications. For example, gas turbine engines used as aircraft main engines may provide propulsion for the aircraft but are also used to provide power generation. Such propulsion systems for aircraft must deliver high performance in a compact, lightweight configuration. This is particularly important in smaller jet propulsion systems typically used in regional and business aviation applications as well as in other turbofan, turboshaft, turboprop and rotorcraft applications. A well-known way to improve engine efficiency is to increase the overall pressure rise of the compressor.

The airfoil blade loadings or stage counts for the fan (i.e. low pressure compressor) and high-pressure compressor may be increased for increasing cycle pressure ratios ($P_{outlet}/P_{inlet}$) to improve turbine engine performance. Increasing stage count has a detrimental impact on engine length, weigh and cost. Increasing airfoil loading (with increased pressure rise in each stage) has a tendency to reduce the compressor surge margin and stability margin such that the compressor must be operated away from a near stall condition, thereby reducing efficiency potential using conventional engine design technology. However, the reduced surge margin and lower efficiency potential can cause engine instability, increased specific fuel consumption and increased turbine operating temperatures in both steady state and transient operation.

Accordingly, there is a need for an improved compressor configuration that achieves the required surge and stability margins and maintains the efficiency potential of the turbine engine. There is also a need for an improved gas turbine engine with an improved compressor configuration that achieves the required surge and stability margins and maintains the efficiency potential of the turbine engine. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

The present disclosure provides a turbomachine including a first turbomachinery component rotatable relative to a second turbomachinery component for generating an aft axial fluid flow through the turbomachine. A tip gap exists between the first and second turbomachinery components, and at least one of the first and second turbomachinery components is configured to define a non-constant clearance region in the tip gap between a leading edge position and a medial chord position having a minimum tip gap clearance. A portion of the second turbomachinery component has a grooved section including a plurality of serrations or rectangular groove segments extending radially into a surface in the non-constant clearance region for resisting a reverse axial fluid flow through the tip gap when the turbomachine is operated at a near stall condition. As used herein, the aft flow direction refers to desirable fluid flow in the normal operating direction, whereas the reverse flow direction refers to the undesirable backflow.

The present disclosure also provides a compressor section for a gas turbine engine including a compressor shroud having a plurality of groove segments extending radially into a shroud surface on the compressor shroud to define a grooved section. A rotor assembly is rotatably supported within the compressor shroud. The rotor assembly includes a rotor hub and a plurality of rotor blades, each rotor blade extending radially from the rotor hub and terminating at a blade tip spaced from the shroud surface by a tip gap. At least one of the blade tip and the shroud surface is configured to define a non-constant clearance region between a leading edge position and a mid-chord position on the blade tip. The rotor blades generate an aft axial fluid flow in the compressor shroud region. A tip gap exists between the blade tip and the compressor shroud. The grooved section is formed in the shroud surface at the non-constant clearance region for resisting a reverse axial fluid flow through the tip gap when the compressor section is operated at near stall conditions.

Furthermore, other desirable features and characteristics of the apparatus and method will become apparent from the subsequent detailed description and the appended claims, taken in conjunction with the accompanying drawings and the preceding background.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with the present disclosure, the rotor tip geometry and casing geometry are integrated to provide a uniquely robust system that retains high efficiency and operability throughout all operating conditions including near stall condition and after encountering a rub event. Specifically, the present disclosure provides a turbomachine, and more particularly a compressor section that has a non-constant clearance region extending from a leading edge position to a median chord position on the rotor blade. The median chord position is identified as the location along the rotor blade chord having the minimum tip gap clearance. In this regard, the tip clearance at the leading edge is larger than at the median chord position, in order to avoid or lessen the severity of a rub event on the leading edge, which is typically thinner and more easily bent, while maintaining relatively tight average running clearance. The non-constant clearance region may be achieved by increasing the height of the blade in the mid-span relative to the leading edge, or by contouring the shroud or by both modifications. It should be noted that increasing the leading edge clearance may have a detrimental effect on surge margin.

A grooved section is formed in the non-constant clearance region upstream of the minimum tip gap clearance, and includes a plurality of groove segments extending radially into a shroud surface formed on the compressor shroud for disrupting a reverse axial fluid flow therethrough when the turbomachine is operated at near stall conditions. The grooved section may extend upstream of the non-constant clearance region, even to a position upstream of the leading tip, such that the grooved section is not exclusively within the non-constant clearance region. The location and configuration of the grooved section are readily adapted to minimize the aft low value groove segments (i.e., downstream of the median chord position) and to tailor the size, count, and location of the forward groove segments (i.e., upstream of the medial chord position) as a function of the clearance variation to provide tight running clearances in advance of rub event, while maintaining robust performance retention in the event of a rub. In particular, the last groove segment is within 40% of the rotor blade chord from the leading edge and preferably between 20% and 30% of the rotor blade chord, thus eliminating the cost and efficiency debits of these low value groove segments. The groove segments are preferably large relative to the tip clearance gap with the groove depth being greater than 3 times the minimum tip gap. Additionally or alternatively, the groove depth may be between 3 times and 20 times the crown and preferably between 5 times and 15 times the crown. The term "crown" or "tip gap crown" is used to define the difference between the minimum the tip gap clearance and the maximum tip gap clearance upstream of the minimum tip gap clearance when at the design operating condition of the compressor, which for an aircraft propulsion engine, would be a sea-level, takeoff condition.

Figure 1:
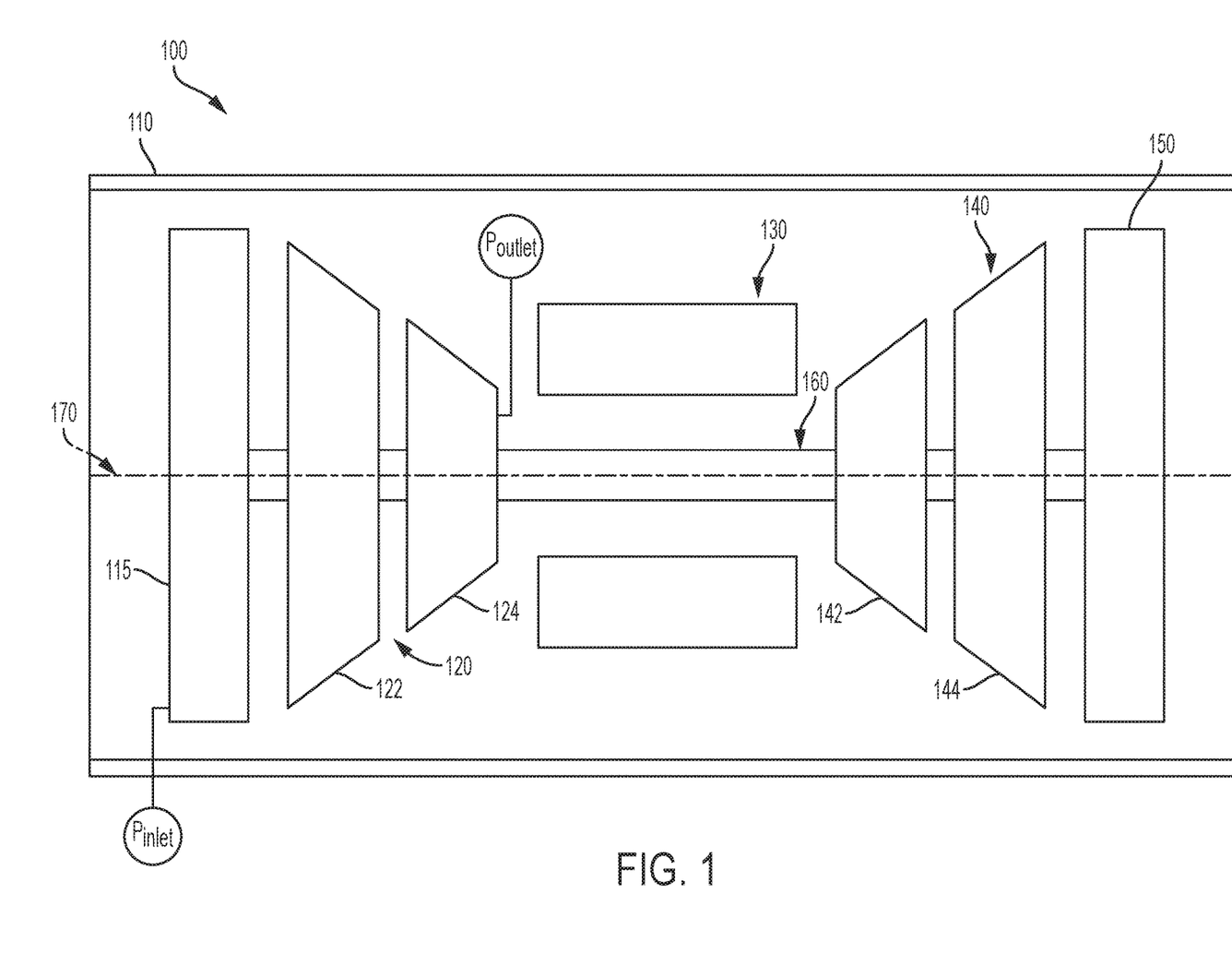
FIG. 1 is a simplified cross-sectional side view of a gas turbine engine according to an exemplary embodiment.

Reference now is made to FIG. 1, which shows a simplified, cross-sectional view of a gas turbine engine 100 according to an embodiment. The engine 100 includes an engine housing 110, an intake section 115, a compressor section 120, a combustion section 130, a turbine section 140, and an exhaust section 150. The compressor section 120 and turbine section 140 are operably coupled to a shaft assembly 160 for rotation within the housing 110. A fluid is drawn into the engine housing 110 through the intake section 115 (which may include a fan module) and into the compressor section 120. The compressor section 120 may include a first compressor section 122 and a second compressor section 124 that increases the pressure of the fluid entering the engine 100 and may also result in heating of the fluid therethrough. In one embodiment, the first compressor section 122 may be an axial compressor having one or more stages and the second compressor section 124 may be a centrifugal compressor. The compressor section 120 is in fluid communication with the combustion section 130 and directs the compressed fluid into a combustion chamber where the compressed fluid is mixed with fuel and combusted therein. Hot exhaust fluids are then directed from the combustion chamber 130 into the turbine section 140. The hot exhaust fluids expand through and rotate the turbine section 140 prior to being exhausted through the exhaust section 150 of the engine 100.

The turbine section 140 rotates to drive equipment in the engine 100 via rotors or spools (not shown) concentrically disposed on the shaft assembly 160 about an axis of rotation 170. Specifically, the turbine section 140 may include one or more rotors 142, 144 driven by the expanding exhaust fluids to rotate the shaft assembly 160 and drive the compressor section 120, in particular the first and second compressor sections 122, 124. While FIG. 1 depicts an exemplary configuration having an axi-centrifugal compressor core in a turboshaft engine, other embodiments may have alternate configurations. Thus, the exemplary embodiments discussed herein are not intended to be limited to a turboshaft engine, but rather may be readily adapted for use in other types of turbine engines including but not limited to turbofan and turboprop engines or other turbomachines.

Figure 2:
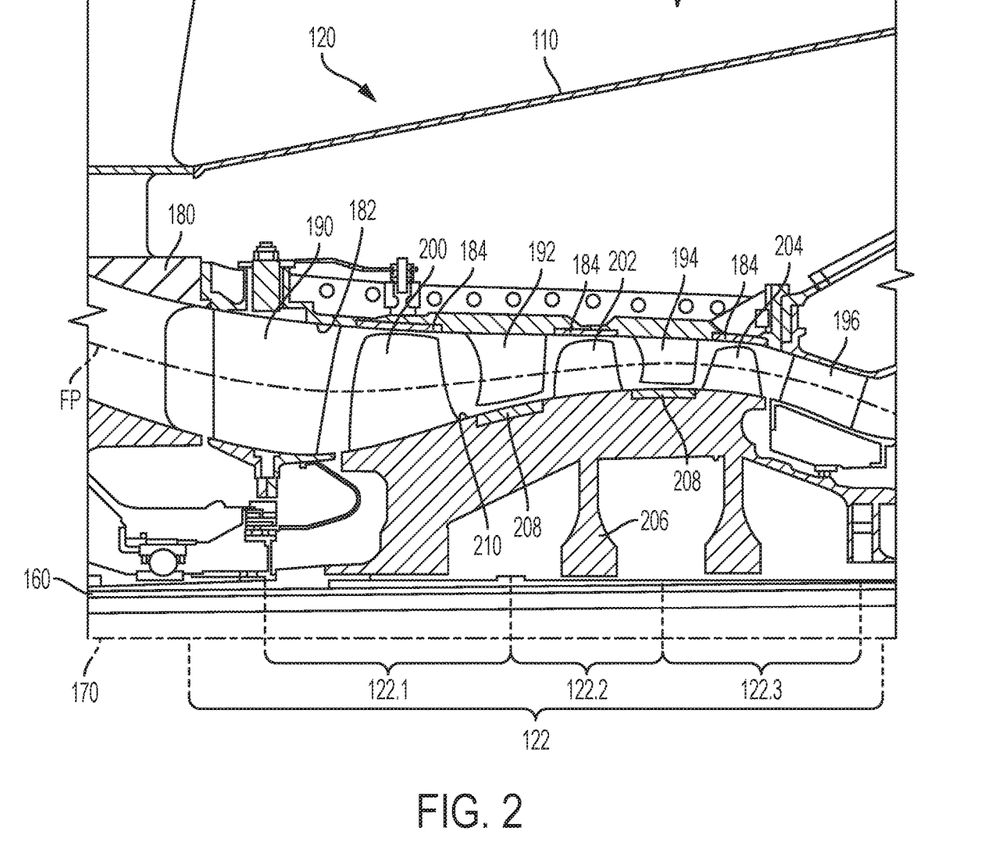
FIG. 2 is a partial cross-sectional view of an axial compressor section suitable for use with the engine of FIG. 1 having annular inserts disposed adjacent the blade tips and vane tips of the compressor section.

FIG. 2 is a more detailed partial cross-sectional view of the compressor section 120, and specifically the first compressor section 122 and a portion of the shaft assembly 160 of the engine 100 shown in FIG. 1 in accordance with an exemplary embodiment. In FIG. 2, only half the cross-sectional view of the compressor section 120 is shown; the other half would be substantially rotationally symmetric about a centerline and axis of rotation 170. Additionally, certain aspects of the engine 100 may not be shown in FIG. 2, or only schematically shown, for clarity in the relevant description of exemplary embodiments. Fluid flows generally axially from a compressor inlet through the compressor section 120 along a mean line flow path FP (indicated by the long dash - short dash line) to a compressor exit, which is in fluid communication with the combustion section 130 (shown in FIG. 1). As such, aft axial flow refers to fluid flow generally in a direction from compressor inlet toward compressor outlet or in other words from left to right as shown in FIG. 2. Likewise, reverse axial flow refers to fluid flow generally in a direction opposite aft fluid flow or in other words in a direction from right to left as shown in FIG. 2. One skilled in the art will understand that FIG. 2 illustrates a simplified cross-section through an axial compressor section, and that other features may be included in the compressor section 120 along the flow path FP as dictated by the specification and constraints associated with a particular intended use and without departing from the spirit and scope of the subject matter disclosed and claimed herein.

The axial compressor section 122 progressively compresses fluids flowing generally axially along the flow path FP. The axial compressor section 122 includes a shroud casing 180 surrounding one or more axial compressor stages 122.1, 122.2, 122.3. For example, as shown in FIG. 2, the axial compressor section 122 includes one or more stator assemblies 190, 192, 194, 196 and one or more blade assemblies 200, 202, 204. The stator assemblies 190, 192, 194, 196 may include a plurality of stator vanes arranged in one or more vane rows which function to diffuse and direct the fluid along the flow path FP. The stator vanes extend radially inward from the shroud casing 180 and terminate at a vane tip adjacent rotor hub 206. Annular inserts 208 are disposed in an annular surface 210 on the rotor hub 206 adjacent the vane tips of stator assemblies 192 and 194.

The rotor assemblies 200, 202, 204 includes a plurality of rotor blades fixed for rotation on the rotor hub 206 and are configured in one or more blade rows, which are rotatably driven on the shaft assembly 160. As the rotor assemblies 200, 202, 204 rotate, the fluid flowing across each blade row are incrementally compressed along the flow path FP. Each rotor blade extends radially outward from the rotor hub 206 and terminates at a blade tip adjacent a shroud surface 182 formed on the shroud casing 180. Annular inserts 184 are disposed in the shroud surface 182 on the shroud casing 180 adjacent the blade tips of rotor assemblies 200, 202 and 204.

One skilled in the art will understand that the present disclosure is not limited to the specific number and/or arrangement of stator and rotor assemblies illustrated in FIG. 2, and that other configurations for the axial compressor section 122 are contemplated within the scope of the subject matter described and claimed herein. Modifications may include but are not limited to the use of multiple stators or double row stators within a given axial compressor stage, variable stator vanes, or struts.

Figure 3A:
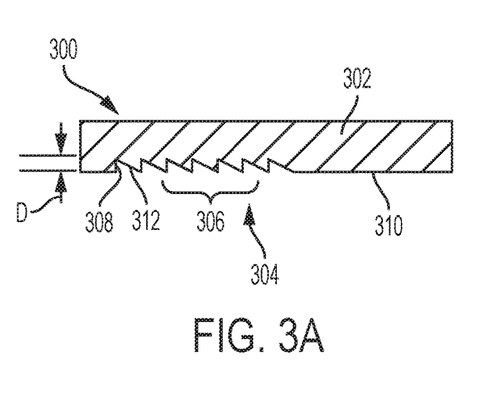
FIGS. 3A and 3B are simplified cross-sections of annular inserts with a grooved section formed therein.
Figure 3B:
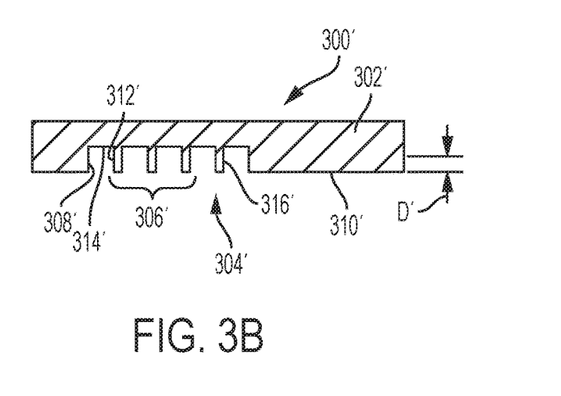

Inserts 184, 208 have a grooved section (not shown in FIG. 2) formed in the surface facing the tips of adjacent vanes and/or blades as the case may be. In one embodiment, the insert may be formed with an abradable material (such as material formed with a porous, small sub matrix material that will wear away when contacted by a rotating blade) for minimizing potential damage to the blade tips resulting from a rub event. With reference now to FIGS. 3A and 3B, inserts 300 and 300' represent exemplary embodiments for the annular inserts 184, 208 described above. Inserts 300, 300' include an annular body 302, 302' having a grooved section 304, 304', respectively, formed in a surface 310, 310'. The grooved section 304, 304 is defined by a plurality of saw-tooth segments 306 or rectangular groove segments 306', collectively referred to as groove segments or simply segments. In the case of an insert 184 positioned adjacent the blade tips, the grooved sections 304, 304' are formed in the radially inner surface of the annular body 302, 302'. In the case of an insert 208 positioned adjacent the vane tips, the grooved sections 304, 304' are formed in the radially outer surface of the annular body 302, 302'.

With specific reference to FIG. 3A, the grooved section 304 is formed by a plurality of saw-tooth segments 306 extending into the annular body 302. Each saw-tooth segment 306 defines a serration having a leading face 308 extending generally perpendicular from the surface 310 and a trailing face 312 extending from the leading face 308 up to the surface 310. Collectively, the saw-tooth segments 306 form a continuous serration configuration for the grooved section 304. With reference now to FIG. 3B, the grooved section 304' is formed by a plurality of rectangular groove segments 306' extending into the annular body 302'. Each rectangular groove segment 306' has a leading face 308' and a trailing face 312' extending generally perpendicular to the surface 310', as well as a root 314' extending between the leading and trailing faces 308', 312'. Collectively, the rectangular groove segments 306' form a stepped or ribbed configuration 316' for the grooved section 304'.

One skilled in the art should appreciate that the foregoing embodiments are merely exemplary, and that modification are contemplated with the scope of the present disclosure. For example, the grooved section may be configured in a variety of ways depending on the specific application and operating conditions. For example, the grooved section may form a symmetric or asymmetric configuration in the aft axial flow direction. The groove segments may be formed concentric to the axis of rotation 170 or offset to create a grooved section having a helical effect. While the grooved sections have been described in terms of specific cross-sectional configurations (e.g., saw-tooth or rectangular), the cross-section of the groove segments may be configured in any suitable manner (e.g., V-shaped, U-shaped, semicircular, radiused, etc.) to form the grooved section, provided that a portion of the leading face 308, 308' at the surface 310, 310' is substantially normal to the aft axial flow direction. Furthermore, the grooved section may be formed by a plurality of adjacent segments forming a continuous grooved section with no intervening surface, or may be formed by discrete sets of segments spaced apart with one or more intervening surface to form an interrupted grooved section. In another embodiment, the grooved section may be formed directly into the surface of the shroud casing, thus eliminating the need for an insert.

With reference now to FIGS. 4-7, various exemplary embodiments are illustrated with different blade tip configurations or shroud surface configurations to provide a non-constant clearance region. In addition, various preferred placements of the serrated grooves section are also illustrated. In these figures, several dimensions are identified, which can be used to characterize the grooved shroud casing treatment. These dimensions include the maximum tip clearance ($C_M$) at the leading edge of the blade, the minimum tip clearance ($C_m$) at a medial chord position, which is shown as the chord of the blade, the tip clearance ($C_t$) at the trailing edge of the blade, the blade tip chord length (L), and the length (l) and depth (D) of the serrated or groove segments forming the grooved section. The mid-chord of the blade is defined as the mid-point between the leading edge and the training edge along the blade tip chord. A tip gap crown or simply crown (Cr) is defined as the difference between a minimum tip clearance ($C_m$) along the blade tip chord and a maximum tip clearance ($C_M$) upstream of the minimum tip clearance. As shown in FIGS. 4-7 the maximum tip clearance ($C_M$) is at the leading edge and the minimum tip clearance ($C_m$) is at the mid-chord position; however, in other configurations the maximum and minimum tip clearances may occur at any position between the leading edge and the trailing edge and the maximum clearance upstream of the minimum tip clearance. In this regard, the location of the minimum tip gap ($C_m$) along the tip blade chord between the leading edge and the trailing edge is referred to as the medial chord position herein.

Figure 4:
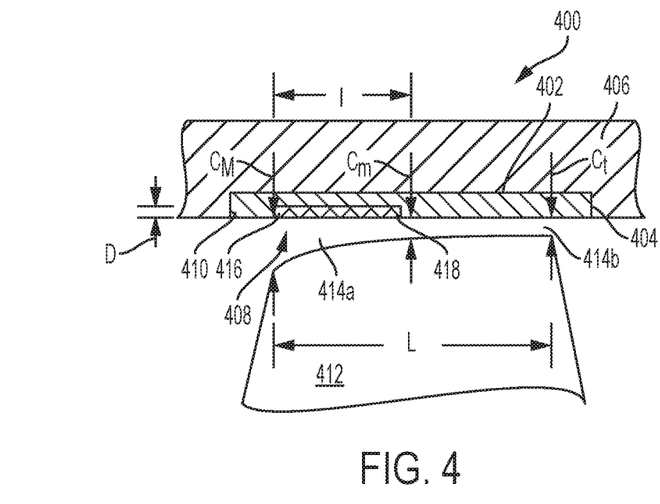
FIG. 4 is a simplified detail of a compressor stage having a contoured blade tip and a grooved shroud casing treatment in the non-constant clearance region of the tip gap according to an exemplary embodiment.

With reference now to the embodiment illustrated in FIG. 4, a grooved shroud casing treatment 400 includes an annular insert 402 seated within a circumferential groove 404 in the shroud casing 406. A grooved section 408 is formed in an inner surface 410 of the annular insert 402. A tip of blade 412 terminates adjacent to the inner surface 410 such that a clearance region 414a, 414b is formed therebetween. The tip of blade 412 is contoured from a leading edge to the medial chord position such that the maximum tip clearance ($C_M$), which is shown at the leading edge, is greater than the minimum tip clearance ($C_m$), which is shown at the mid-chord position, and the clearance region 414a therebetween is a non-constant clearance region. In other words, the tip clearance converges in the direction of aft axial flow along the blade tip chord from the leading edge to the medial chord position of the tip of blade 412 to form a non-constant clearance region. The trailing edge clearance ($C_t$) is the same as the minimum tip clearance ($C_m$) such that the clearance region 414b therebetween is constant. In other configurations, however, the trailing edge clearance ($C_t$) may be greater than the minimum tip clearance ($C_m$) such that the clearance region 414b diverges in the direction of aft axial flow along the blade tip chord. The grooved section 408 is positioned upstream or in front of the minimum tip clearance ($C_m$), beginning at a first segment 416 that projects to the leading edge of the tip of blade 412 and ending at a last segment 418 that projects to a point about 40% along the blade tip chord in the aft axial flow direction. Thus, the ratio of blade tip chord length (L) to the grooved section length (l) is about 5:2.

Figure 5:
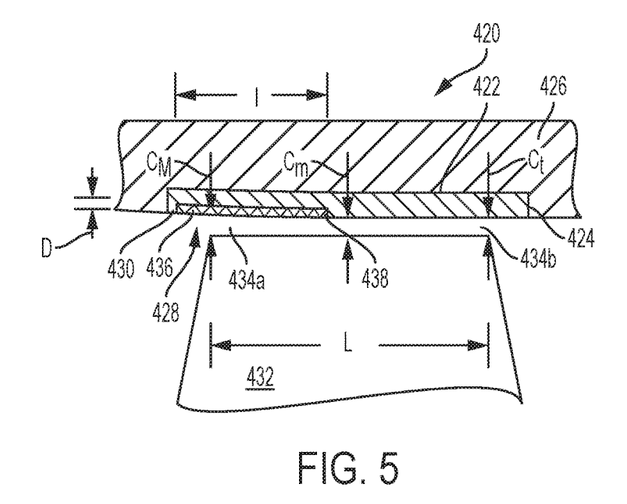
FIG. 5 is a simplified detail of a compressor stage having a contoured shroud surface and a grooved shroud casing treatment in the non-constant clearance region of the tip gap according to an exemplary embodiment.

With reference now to the embodiment illustrated in FIG. 5, a grooved shroud casing treatment 420 includes an annular insert 422 seated within a circumferential groove 424 in the shroud casing 426. A grooved section 428 is formed in an inner surface 430 of the annular insert 422. A tip of blade 432 terminates adjacent to the inner surface 430 such that a clearance region 434a, 434b is formed therebetween. The inner surface 430 is contoured from a point before the leading edge of the tip of blade 432 to a point at the mid-chord. Because of the contoured inner surface 430, the maximum tip clearance ($C_M$), which is shown at the leading edge, is greater than the minimum tip clearance ($C_m$), which is shown at the mid-chord position, and the clearance region 434a therebetween is a non-constant clearance region. In other words, the tip clearance converges in the direction of aft axial flow along the blade tip chord from before leading edge to the medial chord position of the tip of blade 432. The trailing edge tip clearance ($C_t$) is the same as the minimum tip clearance ($C_m$) such that the clearance region 434b therebetween is being constant. In other configurations, however, the trailing edge tip clearance ($C_t$) may be greater than the minimum tip clearance ($C_m$) such that the clearance region 434b diverges in the direction of aft axial flow along the blade tip chord. The grooved section 428 is positioned upstream or in front of the minimum tip clearance ($C_m$), beginning at a first segment 436 that is upstream of the leading edge of the tip of blade 432 and ending at a last segment 438 that projects to a point about 40% along the blade tip chord in the aft axial flow direction. Thus, the ratio of blade tip chord length (L) to the grooved section length (l) is about 2:1.

Figure 6:
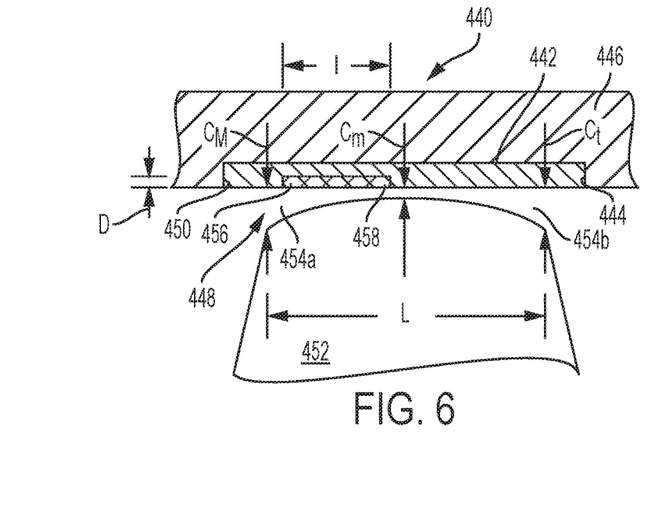
FIG. 6 is a simplified detail of a compressor stage having a contoured blade tip and a grooved shroud casing treatment extending in the non-constant clearance region of the tip gap according to an exemplary embodiment.

With reference now to the embodiment illustrated in FIG. 6, a grooved shroud casing treatment 440 includes an annular insert 442 seated within a circumferential groove 444 in the shroud casing 446. A grooved section 448 is formed in an inner surface 450 of the annular insert 442. A tip of blade 452 terminates adjacent to the inner surface 450 such that a clearance region 454a, 454b is formed therebetween. The tip of blade 452 is contoured from a leading edge to the mid-chord such that the maximum tip clearance ($C_M$), which is shown at the leading edge, is greater than the minimum tip clearance ($C_m$), which is shown at the mid-chord position, and the clearance region 454a therebetween is a non-constant clearance region. In other words, the tip clearance converges in the direction of aft axial flow along the blade tip chord from the leading edge to a median chord position of the tip of blade 452. The tip of blade 452 is also contoured from the median chord position to the trailing edge such that the minimum tip clearance ($C_m$) is less than the trailing chord tip clearance ($C_t$), and the clearance region 454b therebetween is a non-constant, diverging clearance region in the direction of aft axial flow along the blade tip chord from the median chord position to the trailing edge of the tip of blade 452. One skilled in the art will recognize that the clearance region 454b may also remain constant in the direction of aft axial flow along the blade tip chord from the minimum tip clearance ($C_m$) to the trailing edge tip clearance ($C_t$). The grooved section 448 is positioned upstream or in front of the minimum tip clearance ($C_m$), beginning at a first segment 456 that projects to a point about 15% along the blade tip chord from the leading edge in the aft axial flow direction and ending at a last segment 458 that projects to a point about 40% along the blade tip chord in the aft axial flow direction. Thus, the ratio of blade tip chord length (L) to the grooved section length (l) is about 4:1.

Figure 7:
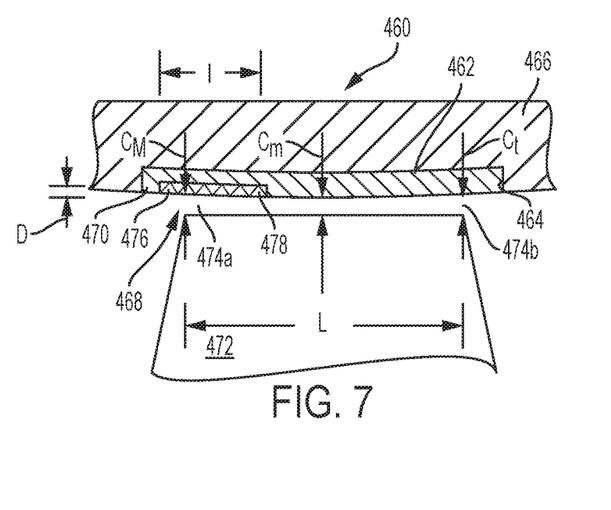
FIG. 7 is a simplified detail of a compressor stage having a contoured shroud surface and a grooved shroud casing treatment extending in the non-constant clearance region of the tip gap according to an exemplary embodiment.

With reference now to the embodiment illustrated in FIG. 7, a grooved shroud casing treatment 460 includes an annular insert 462 seated within a circumferential groove 464 in the shroud casing 466. A grooved section 468 is formed in an inner surface 470 of the annular insert 462. A tip of blade 472 terminates adjacent to the inner surface 470 such that a clearance region 474a, 474b is formed therebetween. The inner surface 470 is contoured from a point before the leading edge of the tip of blade 472 to a point at the mid-chord. Because of the contoured inner surface 470, the maximum tip clearance ($C_M$), which is shown at the leading edge, is greater than the minimum tip clearance ($C_m$), which is shown as the mid-chord position, and the clearance region 474a therebetween is a non-constant clearance region. In other words, the tip clearance converges in the direction of aft axial flow along the blade tip chord from the leading edge to the medial chord position of the tip of blade 472. The inner surface 470 is also contoured from the medial chord position to the trailing edge such that the minimum tip clearance ($C_m$) is less than the trailing chord tip clearance ($C_t$), and the clearance region 474b therebetween is a non-constant, diverging clearance region in the direction of aft axial flow along the blade tip chord from the medial chord position to the trailing edge of the tip of blade 472. One skilled in the art will understand that the clearance region 474b may also remain constant in the direction of aft axial flow along the blade tip chord from the medial chord position to the trailing edge. The grooved section 468 is positioned upstream or in front of the minimum tip clearance ($C_m$), beginning at a first segment 476 that is upstream of the leading edge of the tip of blade 472 and ending at a last segment 478 that projects to a point about 25% along the blade tip chord in the aft axial flow direction. Thus, the ratio of blade tip chord length (L) to the grooved section length (l) is about 2:1.

As will be appreciated from the example embodiments described above that the specific location and length of the serrated section 408, 428, 448, 468 in the tip clearance region 414, 434, 454, 474 may be modified for resisting a reverse axial fluid flow therethrough when the turbomachine or compressor section is operated at near stall conditions. Similarly, the depth (D) of the groove segments may be configured in terms of the clearance variations or other characteristic dimensions to provide tight running clearances and robust performance retention at near stall conditions. At conditions near stall the airfoil aerodynamic loading (defined as exit pressure dived by inlet pressure at a specified rotational speed) is at maximum and any further exit pressure increase will cause reverse flow towards the inlet to occur. In this case, the tip airfoil aerodynamic loading is sufficiently high so that the exit high pressure will reverse flow to the lower inlet pressures and a stall occurs, having originated in the tip region.

With reference to FIGS. 3A, 3B and 4-7, the depth D, D' of the groove segments 306, 306' (FIGS. 3A, 3B) may be proportional to the maximum tip clearance, or alternately at least 3 times the minimum tip clearance in the non-constant clearance region. In another embodiment, the depth D, D' of the groove segments may be a function of the tip gap crown (Cr). For example, the depth D of the groove segments may be in a range between 3 times and 20 times the tip gap crown (Cr), and preferably the depth D of the groove segments may be in a range between 5 times and 15 times of the tip gap crown (Cr). All of the groove segments may have the same depth or each groove segment may vary within the ranges described above.

While several exemplary embodiments have been presented in the foregoing detailed description of the invention, it should be appreciated that a vast number of variations exist. It should also be appreciated that the exemplary embodiments are only examples, and are not intended to limit the scope, applicability, or configuration of the invention in any way. For example, the principles and concepts described and illustrated herein, and in particular the use of a grooved shroud surface treatment or grooved hub surface treatment employed in the non-constant clearance regions where required may have utility in other types of compressor sections, as well as other turbomachinery having a first turbomachinery component rotatable relative to a second turbomachinery component to generate an aft axial fluid flow and resist reverse axial flow in a tip gap formed between the first turbomachinery component and the second machinery component. Furthermore, the specific structure, arrangement and configuration of the various embodiments may be combined and/or interchanged. As such, the foregoing detailed description will provide one skilled in the art with a convenient road map for implementing an exemplary embodiment of the invention. It being understood that various changes may be made in the function and arrangement of elements described in an exemplary embodiment without departing from the scope of the invention as set forth in the appended claims.

We claim:

1. A turbomachine comprising:
   a first turbomachinery component rotatable relative to a second turbomachinery component to generate an aft axial fluid flow therein, wherein a tip gap formed between the first turbomachinery component and a surface adjacent the first turbomachinery component on the second turbomachinery component includes a non-constant clearance region between a first position at a leading edge on the first turbomachinery component and a second position having a minimum tip gap clearance downstream of the first position in an aft axial fluid flow direction; and
   a grooved section including a plurality of groove segments extending radially into the surface in the non-constant clearance region for resisting a reverse axial fluid flow through the tip gap,
   wherein a depth of the plurality of groove segments is between 3 times and 20 times of a tip gap crown, wherein the tip gap crown is defined as the difference between the minimum tip gap clearance and a maximum tip gap clearance upstream of the minimum tip clearance in the tip gap.

2. The turbomachine according to claim 1, wherein the depth of the plurality of groove segments is between 5 times and 15 times of the tip gap crown.

3. The turbomachine according to claim 1, wherein the grooved section terminates at a last segment in the aft axial fluid flow direction, and the last segment projects to a point that is 40% of a tip chord from the leading edge on the first turbomachinery component.

4. The turbomachine according to claim 1, wherein the plurality of groove segments comprises a plurality of saw-tooth groove segments, each saw-tooth groove segment having a leading surface which is perpendicular to the aft axial flow direction and a trailing surface extending from the leading surface to the surface formed on the second turbomachinery component.

5. The turbomachine according to claim 4, wherein the plurality of groove segments are arranged to form a continuous serration having no intervening surface.

6. A compressor section for a gas turbine engine comprising:
   a housing with a shroud surface having a grooved section including a plurality of groove segments extending radially into the shroud surface; and
   a rotor assembly rotatably supported within the housing, the rotor assembly including a rotor hub and a plurality of rotor blades extending radially from the rotor hub and terminating at a blade tip spaced from the shroud surface by a tip gap and defining a non-constant clearance region between a first position at a leading edge on the rotor blade and a second position having a minimum tip gap clearance downstream of the first position in an aft axial fluid flow direction;
   wherein the rotor blades generate an aft axial fluid flow in the housing and the grooved section is formed in the shroud surface in the non-constant clearance region for resisting a reverse axial fluid flow through the tip gap,
   wherein a depth of the plurality of groove segments is between 3 times and 20 times of a tip gap crown, wherein the tip gap crown is defined as the difference between the minimum tip gap clearance and a maximum tip gap clearance upstream of the minimum tip clearance in the tip gap.

7. The compressor section according to claim 6, wherein the depth of the plurality of groove segments is between 5 times and 15 times of the tip gap crown.

8. The compressor section according to claim 6, wherein the grooved section terminates at a last segment in the aft axial fluid flow direction, and the last segment projects to a point that is 40% of a tip chord from the leading edge on the rotor blade.

9. The compressor section according to claim 6, wherein the grooved section comprises a plurality of saw-tooth segments, each saw-tooth segment having a leading surface which is generally perpendicular to the aft axial flow direction and a trailing surface extending from the leading surface to the shroud surface.

10. The compressor section according to claim 9, wherein the plurality of groove segments are arranged to form a continuous serration having no intervening shroud surface.

11. The compressor section according to claim 6, wherein the grooved section begins at a first segment in the aft axial fluid flow direction, and wherein first segment is upstream of a leading edge of the rotor blades such that at least a portion of the grooved section extends in front of the tip gap.

\* \* \* \* \*